United States Patent [19]
Audsley et al.

[11] Patent Number: 5,653,629
[45] Date of Patent: Aug. 5, 1997

[54] TREATMENT OF BIRDS: HUMANE SLAUGHTER OF POULTRY

[75] Inventors: Antony Roger Spencer Audsley, Cheddar; Neville George Gregory; Ambur Balakrishnan Mohan Raj, both of Bristol, all of England

[73] Assignee: The BOC Group plc, Windlesham, England

[21] Appl. No.: 600,124

[22] Filed: Feb. 12, 1996

Related U.S. Application Data

[63] Continuation of Ser. No. 155,076, Nov. 19, 1993, abandoned, which is a continuation of Ser. No. 631,574, Dec. 21, 1990, abandoned.

[30] Foreign Application Priority Data

Dec. 21, 1989 [GB] United Kingdom ............... 8928934

[51] Int. Cl.$^6$ ..................................................... A22B 3/00
[52] U.S. Cl. ..................................................... 452/66
[58] Field of Search .............................. 452/66, 67, 54, 452/57

[56] References Cited

U.S. PATENT DOCUMENTS

| | | | |
|---|---|---|---|
| 81,185 | 8/1868 | Lugo | 452/66 |
| 3,230,577 | 1/1966 | Hughes | 452/66 |
| 4,888,855 | 12/1989 | Haumann et al. | 452/66 |
| 5,186,677 | 2/1993 | Christensen et al. | 452/66 |

FOREIGN PATENT DOCUMENTS

| | | | |
|---|---|---|---|
| 61-42539 | 9/1986 | Japan . | |
| 62-282535 | 12/1987 | Japan . | |
| 0282535 | 12/1987 | Japan | 452/66 |
| 231638 | 2/1990 | Japan . | |
| 2072822 | 3/1990 | Japan | 452/66 |
| 182827 | 12/1976 | New Zealand . | |
| 384495 | 9/1973 | U.S.S.R. | 452/66 |
| 8807328 | 10/1988 | WIPO . | |

OTHER PUBLICATIONS

P.J. Kettlewell: "Recent Developments In the Slaughter of Poultry" from: Human Slaughter of Animals for Food; Proceedings of a Symposium on Sep. 18, 1996.
E., Lambooy et al: Euthansasie van varkens, die op gron van veewet afgemaakt moeten worden, II. Rapport B–161 –Apr. 1980.
A.W. Kotula et al: "Experminetation iwth In–Line Carbon Dioxide Immobilization Of Chickens Prior to Slaughter" from Poultry Science r40 (1961).
G.C. Mead, Processing Of Poultry, Bibliotheek, C.O.V.P. "Het Spelderholt", P.B. 15 7360 DA Beekbergen.
Poultry Science, vol. 40, Published by The Poultry Science Association, Guelph, Ontario, Canada 1961.
Carbon Dioxide Immobilization of Turkeys Before Slaughter —United States Department of Agriculture, Washington, DC Feb. 1955.
Slaughter of Stock, D.K. Blackmore and M.W. Delany— Publication No. 118, Department of Veterinary Pathology and Publich Health Masey University.
Euthanasia of Day Old Male Chicks in the Poultry Industry —W. Jaksch, in: Int. Journal for the Study of Animal Problems 2 (4), 1981 pp. 203–213.
Physiological and Behavioural responses of the Domestic Hen to Hypoxea, S.C. Woolley and M.J. Gentle, in : Research in Veterinary Science, 1988, vol. 45, pp. 377–382.
Experimentation With In–Line Carbon Dioxide Immobiliziation of Chickens Prior to Slaugher, A.W. Kotula, E.E. Drenniak and L..L. Davis, in: Poultry Science, vol. 40, 1961.
Effect of Carbon Dioxide Immobilization of the Bleeding of Chickens, A.W. Kotula, E.E. Drewniak and L.L. Davis in: Poultry Science, vol. 36, 1957, pp. 585–589.
The Slaughter of Poultry for Human Consumption, W.N. Scott, in: Animal Regualtion Studies, vol. 1, 1978, pp. 227–234.
Betaubung von Slachttierren; Teil I: CO2 Betaubung, B. VonHertramf and G.v. Mickwitz, in Deutsche Tieratzliche Wochenscrift, Nr. 12 1986 pp. 504–510.
"The Current Roles of Inert Gases in the Search for Anaesthesia Mechanisms", Pharmacological Reviews, Mar. 1963.
"Carbon Dioxide Stunning of Broilers", I. Bogdonov et al. Meat Technology Research Institute, Sofia, Bulgaria.
"Effect of Stunning Poultry with Carbon Dioxide on the Looseness of the Feathers", V. Svetlov, Mayasnay Industriya SSSR, 1969, vol. 40 (11), pp. 39–40.
"Humane Slaughter and Euthanasia," Laboratory Science and Technology, Nov. 1986.
"Experimentation with In–line Carbon Dioxide Immobilization of Chickens Prior to Slaughter", Kotula, Poultry Sci., XL, 1/61.
"Effect of Carbon Dioxide Immobiliation on the Bleeding of Chickens", Kotula, Poultry Sci., XXXVI #3., May 1957, pp. 585–589.
"Effect of Electrical Stunning on Somatosensory Evoked Potential in Chickens", Gregory, Bri. Vet. J., 1989, pp. 145–159.
"Effect of Slaughter on the Spontaneous and Evoked Activity of the Brain"; Gregory, British Poultry Sci., vol. 27 (1986) pp. 195–205.
"Carbon Dioxide Immobilization of Turkeys Before Slaughter"; Circular No. 958; U.S. Dept. of Agriculture, Feb. 1955.

*Primary Examiner*—Willis Little
*Attorney, Agent, or Firm*—David M. Rosenblum; Salvatore P. Pace

[57] ABSTRACT

Poultry packed in a crate suitable for the transport of live poultry are passed into a chamber having an oxygen depleted atmosphere and held in the atmosphere for a sufficient period of time for the poultry first to lose consciousness and then to die as a result of the lack of oxygen in the atmosphere. The atmosphere typically comprises nitrogen or argon containing less than 1% by volume of oxygen. It is found that the birds so slaughtered exhibit less bone damage than poultry slaughtered by a conventional method including the step of electrically stunning the birds prior to slaughter.

3 Claims, No Drawings

TREATMENT OF BIRDS: HUMANE SLAUGHTER OF POULTRY

This is a continuation of application Ser. No. 08/155,076 filed Nov. 19, 1993, now abandoned, which is a continuation of application Ser. No. 07/631,574 filed Dec. 21, 1990, now abandoned.

TECHNICAL FIELD

The present invention relates to the treatment of birds. In particular it relates to a method and apparatus for the slaughter of poultry.

BACKGROUND OF THE PRIOR ART

Poultry are conventionally slaughtered by first electrically stunning each bird in turn and then killing the stunned birds by cutting their necks. The purpose of stunning its to ensure that the birds feel no pain when they are killed. The problem arises however that the stunning process is itself stressful. The electrical stunning procedure involves removing birds from a transport crate, individually shackling them by their legs, conveying each shackled bird to an electric stunning bath in which the head of the bird is immersed in water which acts as the live electrode and current passes through the bird to earth via the shackle. Birds sometimes experience electric shocks before being stunned which can be distressing, and some birds miss the water of the stunner altogether and in this way are conscious during slaughter. The electrical stunning in itself causes electropletic convulsions, which result in haermorrhaging in the muscles of the breast and legs, and broken bones in the carcasses, particularly the collar region.

SUMMARY OF THE INVENTION

The present invention aims at providing a new method and apparatus for slaughtering poultry which eliminates or reduces the stress associated with electrical stunning and also reduces the incidence of muscular haemorrhaging and broken bones in the carcasses.

According to the present invention, there is provided a method of slaughtering poultry, comprising the step of passing the poultry packed in a crate, suitable for the storage of live poultry, into a chamber having an oxygen-depleted atmosphere and holding the poultry in the atmosphere for a sufficient period of time for the poultry first to lose consciousness and then to die as a result of the lack of oxygen in the atmosphere.

The invention also provides apparatus for performing this method, comprising a chamber having at least one access opening whereby crates (suitable for the transport of live poultry) containing the poultry can be introduced into and removed from the chamber, and means for supplying to the chamber gas to form an oxygen-depleted atmosphere whereby an atmosphere, in which the poultry first lose consciousness and then die, can be maintained in the chamber.

The birds are desirably subjected to the method according to the invention in the same crate used to transport them to the place of slaughter, i.e. an abattoir. Accordingly, there is no need for the birds to be contacted by hand in an abattoir prior to slaughter, thereby making the slaughter less stressful to the birds.

DETAILED DESCRIPTION OF THE INVENTION

The composition of the atmosphere in the chamber is preferably selected so as to cause the poultry minimum distress. In one preferred example of the method according to the invention, the atmosphere is based on or consists essentially of nitrogen or argon (or other noble gas), the only sources of carbon dioxide in the atmosphere being any air present and the gases exhaled by the birds; and the atmosphere contains up to 2% by volume of oxygen and most preferably less than 1% by volume of oxygen. Apart from impurities, such an atmosphere preferably contains a balance of nitrogen and/or argon. Such an atmosphere will induce hypocapnic anoxia in the poultry. Suitable atmospheres may thus be formed by mixing nitrogen or argon on the one hand and air on the other hand. The atmosphere will generally have a controlled composition. Preferably, the supply of nitrogen and/or argon from an external source to the atmosphere is controlled in response to the monitored concentration of oxygen in the atmosphere so as to maintain that concentration below a chosen limit.

The atmosphere may alternatively comprise a mixture of nitrogen (or argon or other noble gas) and an anaesthetic proportion of carbon dioxide. Such an atmosphere will indice hypocapnic anoxia in the poultry. When the atmosphere contains a substantial volume of carbon dioxide, a greater concentration of oxygen can generally be tolerated as a result of the anaesthetic properties of carbon dioxide. A suitable atmosphere can be formed by mixing carbon dioxide and air. Such a mixture of carbon dioxide in air will induce hypercapnic hypoxia in the poultry. Experiments on individual birds have shown that poultry can be stunned by using a wide range of carbon dioxide concentrations in a carbon dioxide-air mixture, the carbon dioxide concentration always being at least 35% by volume. Within this range of mixtures, at lower concentrations longer exposure times are required to stun or kill the birds. It is believed that as the concentration of carbon dioxide increases, the pungency may also increase and a concentration of above 45% by volume of carbon dioxide in air results in convulsions during stunning. The convulsions are severe at 65% (by volume) carbon dioxide. A carbon dioxide concentration of 50 to 55% by volume is typically required to kill all the birds within a crate. Accordingly, the poultry may be slaughtered by exposure to a carbon dioxide-air mixture for a period of time of at least two minutes, the atmosphere containing from 50 to 55% by volume of carbon dioxide. Alternatively, in order to stun the birds in an atmosphere which is designed to produce a relatively low occurrence of convulsions, i.e. one having relatively low carbon dioxide concentration, say 30 to 35% by volume, and then effect the slaughter of the birds in an atmosphere containing at least 50% by volume of carbon dioxide, the poultry may be exposed to the stunning atmosphere (30 to 35% by volume of carbon dioxide) for 30 to 60 seconds and thereafter exposed to the atmosphere richer in carbon dioxide (50% or above) for at least one minute (preferably two minutes) to kill them.

Preferably, irrespective of the choice of atmosphere, the birds have their necks cut upon removal from the chamber and are thus bled.

The chamber preferably has associated with it means for conveying the crates into and out of the chamber. In one embodiment of the invention the crates may be conveyed continuously through the chamber, and the extent of the chamber and the rate of passage of the crates may be so chosen that the birds are all dead by the time the crates exit the chamber. Alternatively, the crates may be held stationary in the chamber for a given period of time. This latter arrangement offers the advantage of making possible a chamber of smaller volume to be used, but may be less suitable for continuous slaughter of birds. When different atmospheres are used for stunning and for killing, two separate chambers or alternatively a single chamber divided into two compartments by a curtain or the like may be used in an argon-based atmosphere including less than 1% by volume of oxygen and a 45% by volume $CO_2$—55% by volume air atmosphere show that the birds typically all lose consciousness within a minute. Accordingly, we prefer the residence time of each bird in such an atmosphere to be at least two minutes.

The chamber preferably has at least one fan which is operable to prevent stagnation of the atmosphere therein. Operation of the fan helps to reduce the tendency for local pockets of atmosphere relatively rich in oxygen to be maintained. It is also preferred that the crates have ample ventilation orifices. Such orifices are preferably provided in the base of each crate as well as in the top or sides thereof.

Aspects of the method according to the invention will now be described in the following examples.

EXAMPLE 1

Preliminary investigations on stunning of chickens in a 45% by volume carbon dioxide—55% by volume air atmosphere indicated that the behavioural symptoms that occurred were loss of posture, eye closure, clonic convulsions, tonic convulsions, and relaxation followed by death. In the same study it was found that the chickens did not respond to comb pinch at the time of eye closure. The aim of this study was to relate these behavioural patterns to the spontaneous EEG and time to loss of brain function as determined by the loss of somatosensory evoked potentials (SEPs). Somatosensory evoked potentials have been used previously as an indicator of an effective electrical stun (see Gregory and Wotton, 1989 British Veterinary Journal, volume 145, page 159)(hereinafter "Gregory and Wotton(1989)").

The results indicated that the induction of anaesthesia can be rapid in carbon dioxide stunning and in this respect is suitable for stunning poultry.

Stunning apparatus

The stunning apparatus consisted of a perspex box (62× 62×62 cm) with a front opening door and an upper reservoir (94×62×62 cm). The box and the reservoir were separated by hardboard, and fitted with two circulating fans (6 volts, D.C., 6 cm dia.) ventilating in opposite directions. The fans were covered by metal lids with oil seals to prevent any gas leaking while the upper reservoir was being filled to a predetermined concentration of carbon dioxide.

A bird was placed in the perspex box and the metal lids were opened to mix the carbon dioxide between the box and reservoir. The concentrations of carbon dioxide in the reservoir prior to stunning and in the perspex box during stunning were measured using a carbon dioxide analyser (Servomex gas analyser model 1275, Servomex Ltd, Crowbridge, Sussex).

Experimental Procedures

Seventeen culled hens were implanted with EEG electrodes whilst under pentobarbitone anaesthesia, using the method of Gregory and Wotton (1986 British Poultry Science, volume 27, page 195). The silver—silver chloride electrodes were implanted onto the surface of the cerebrum and secured to the skull with dental cement, and the sutured skin incision was sealed with silicon rubber. After overnight recovery from the anaesthesia, each bird was stunned in the aforesaid atmosphere and this concentration in the perspex box was reached in about 18 seconds after opening the lids which separated the gas in the reservoir from the air in the box.

The somatosensory evoked potentials (SEPs) were induced by electrical stimulation of the superficial ramus of the radial nerve (3.4 volts at 2 stimuli per second) for 1 min pre-stun and 2 min during stunning. The EEG with its somatosensory evoked potentials were recorded onto magnetic tape (TEAC R71, Teac Corporation, Japan) and subsequently used to average evoked responses with a Neurolog averager according to Gregory and Wotton (1989). In addition, the time to eye closure, onset of clonic convulsions, duration of clonic convulsions, onset of tonic convulsions and duration of tonic convulsions were also recorded as the behavioural symptoms associated with carbon dioxide stunning. These events were recorded as commentry onto the same magnetic tape as the SEPs and were analysed later. However, it was possible to recover the timings for only 7 or 8 birds.

The average SEPs occurring during stunning were recognised by their polarity and latency in comparison with the pre-stun SEPs for the same bird. An average of 8 successive stimuli given during 4 seconds ("s") was analysed to identify the presence or absence of SEPs. From the time carbon dioxide was let into the perspex box, the time to loss of SEPs and the changes in the spontaneous EEG were used to evaluate brain activity. In particular we were interested in recording the time to eye closure and investigating its relationship with the time to loss of SEPs, to test whether it could be used as an indicator of brain failure. The time of occurrence of other behaviour patterns was related to changes in the waveforms of the spontaneous EEG.

Statistical analysis

From the data the 95% confidence intervals for each of the parameters were evaluated. A paired t-test was performed to assess the differences between the time to loss of SEPs and eye closure, and between time of loss of SEPs and onset of clonic convulsions.

Results

The results are presented in Table 1. During the pre-stunning period, all the birds had an irregular pattern of low frequency-high amplitude and high frequency-low amplitude waves. After the carbon dioxide was let into the perspex box, there was no indication of changes in the waveform for up to 21±4 s (n=13), except for movement artefacts due to head shaking. Thereafter, the amplitude was gradually suppressed leading to a quiescent phase at 101±18 s (n=15).

Although the SEPs were apparent in all the 17 hens during the pre-stunning period, complete results during the stunning period were obtained for only 9 birds. The remaining birds disconnected their EEG or SEP electrodes during the convulsive phase. The results showed that the SEPs were lost in about 30±2 s, and this occurred 4 s before eye closure ($P<0.05$). The time of onset of convulsions was 15 s later than the loss of SEPs ($P<0.001$). There was not change in the EEG waveform during the clonic convulsions which lasted for 15 s.

The clonic phase was characterised by 2 to 3 episodes of wing flapping. This phase was either immediately followed by a tonic phase or the hens were quiet for a brief period, which varied in duration between individuals. During the tonic phase the hens were rigid, with wings and legs stretched. At the end of this phase, the hens showed paddling movements leading to total relaxation and death.

TABLE 1

The Sequence and Time of Occurrence of Events During Stunning of Chickens in 45% carbon dioxide.

| Events | n | Time of Occurrence(s) | | 95% confidence interval | |
|---|---|---|---|---|---|
| | | mean | S.D. | lower | upper |
| EEG suppression | 13 | 21 | 4 | 19 | 23 |
| Loss of SEPs | 9 | 30 | 2 | 28 | 31 |
| Eye closure | 8 | 34 | 5 | 30 | 38 |
| Onset of clonic phase | 8 | 45 | 4 | 41 | 48 |

TABLE 1-continued

The Sequence and Time
of Occurrence of Events During
Stunning of Chickens in 45% carbon dioxide.

| Events | n | Time of Occurrence(s) | | 95% confidence interval | |
|---|---|---|---|---|---|
| | | mean | S.D. | lower | upper |
| Duration of clonic phase | 8 | 15 | 5 | 11 | 18 |
| Onset of tonic phase | 7 | 68 | 10 | 59 | 78 |
| Duration of tonic phase | 7 | 25 | 7 | 18 | 31 |
| Onset of quiescent EEG | 15 | 101 | 18 | 91 | 111 |

Although the concentration of carbon dioxide rose gradually to 45% over an 18 s period, the occurrence of EEG suppression at 21 s indicated that the induction of anaesthesia was rapid. During the time the EEG showed no change in the waveform to suggest any arousal or increased cerebral activity. If the carbon dioxide had been irritant, one might have expected some EEG arousal.

Since the SEPs were lost well before the onset of convulsions, the hens must have reached a state of brain failure before they convulsed. It appeared that the hens lost their consciousness at some stage between the time of EEG suppression (21 s) and the loss of SEPs (30 s). It is thought that the anaesthetic effect of carbon dioxide suppressed the cerebral activity, as seen in the EEG suppression, releasing the centres in the brain stem and spinal cord which elicit motor incoordination and convulsions.

It is concluded that the induction of anaesthesia with carbon dioxide was rapid and that the convulsive episode occurs whilst the birds are unconscious.

EXAMPLE 2

A similar experiment to that described in example 1 was conducted to investigate the time of loss of SEPs while stunning in argon. The experimental procedures were the same as described under example 1, except for the design of the stunning apparatus. In this study, a wooden box (62× 62×62 cm) with a perspex window and a lid was used as the stunning apparatus. This box was filled with argon to achieve less than 2% oxygen. The hens implanted with electrodes were lowered into the box by using the lid.

Twelve hens were used to investigate the loss of SEPs and spontaneous EEG, whereas, 20 hens were used separately to determine the timings of occurrences of loss of posture, eye closure, onset and durations of clonic and tonic convulsions.

The results indicated that the induction of anaesthesia in argon can be rapid. Although the time to loss of SEPs was later than the time to onset of convulsions, from the spontaneous EEG it could be suggested that the birds might have been in a state of anaesthesia, when they convulsed.

Results

The results are presented in Table 2, which shows that the loss of posture and eye closure occurred in 11 s and 18 s respectively.

Although the loss of SEPs occurred in 29 s, the time to start of clonic convulsions was 22 s. This could mean that the birds began to convulse before they have reached a state of profound brain failure. However, the appearance of low frequency and high amplitude waves at 11 s and subsequently a visible change in the EEG waveform indicating a reduction in the amplitude (referred to as EEG suppression) would imply that the birds were in a state of anaesthesia. These changes in the EEG waveforms gradually resulted in EEG silence in 62. The convulsive episodes were completed in 57 s, after which they were flaccid.

It is concluded that the birds had not lost their brain function when they began to convulse, but the changes in their EEG suggested that they were in a state of anaesthesia. To confirm this, another batch of 10 hens were exposed to less than 2% oxygen by volume for 15–17 seconds and were then tested for response to comb pinching—a painful simulus. None of the hens showed a positive response to comb pinch, suggesting that they were in a state of anaesthesia before the convulsed.

TABLE 2

The Sequence and Time of Occurrence of
Events During Stunning of Chickens in Argon

| Events | Time of occurrence(s) | | 95% confidence interval | |
|---|---|---|---|---|
| | mean | S.D. | lower | upper |
| Spontaneous EEG: | | | | |
| low frequency and high amplitude | 11 | 3 | 9 | 12 |
| EEG suppression | 17 | 3 | 17 | 19 |
| onset of quiescent EEG | 62 | 6 | 57 | 66 |
| Loss of SEPs | 29 | 8 | 24 | 34 |
| Behavioural events: | | | | |
| loss of posture | 11 | 2 | 10 | 12 |
| eye closure | 18 | 3 | 17 | 19 |
| onset of clonic phase | 22 | 4 | 20 | 24 |
| duration of clonic phase | 12 | 3 | 10 | 13 |
| onset of tonic phase | 35 | 5 | 35 | 39 |
| duration of tonic phase | 23 | 8 | 20 | 27 |

EXAMPLE 3

The rate of induction of carbon dioxide anaesthesia was investigated in broilers and hens by exposing the birds to different mixtures of carbon dioxide and air. The results indicated that, in general, the rate of induction is more critical than the final concentration of carbon dioxide; however, in 35% carbon dioxide an exposure time of longer than 5 min is required to Kill the birds. The time to sustained eye closure, time to onset of clonic and tonic convulsions and the duration of convulsive episodes were shorter in broilers than in hens.

Investigations into the effect of carbon dioxide stunning on brain function in chickens (example 1) have shown that the induction of unconsciousness can be quick. For instance, the time to suppression of the spontaneous EEG and somatosensory evoked potentials (SEPs) during stunning of hens with 45% carbon dioxide occurred at 21 and 30 s, respectively. It was found that the hens closed their eyes 4 s after the loss of SEPs, and thus, it was suggested that sustained eye closure could be used as a practical indicator of unconsciousness while stunning chickens with carbon dioxide. In that study, the hens were exposed to 45% carbon dioxide within 18 s. This example set out to determine the extent to which a faster rate of induction could be achieved either by decreasing this 18 s interval (during which the concentration rises) or by increasing the stunning concentration. These features were tested by a) exposing broilers to a final concentration of 45% by volume carbon dioxide in 8 and 18 s (Experiment 1) and b) exposing broilers and hens to one of four final concentrations of carbon dioxide in 8 s (35, 45 55 or 66%: Experiment 2). In this study the time taken to expose the birds to the stunning concentration of carbon dioxide is designated as the accession period.

Chickens were stunned by drawing carbon dioxide from an upper reservoir into a stunning chamber using fans fitted with lid valves. To achieve the two different accession periods (the time to fill the stunning chamber), different sized circulating fans were used. The different stunning concentrations were obtained by regulating the concentration in the upper reservoir prior to opening the valves. In both the experiments the time to the onset of sustained eye closure was used as an indicator of unconsciousness. In addition, the time to onset of clonic convulsions, duration of clonic convulsions, onset of tonic convulsions and duration of tonic convulsions were also determined. All the events were recorded by using a computer program (BBC-micro) synchronised with the time of opening the lids of the valves.

In Experiment 1, 24 and 17 broilers respectively were exposed to a final concentration of 45% carbon dioxide with 8 and 18 s accession periods. The behavioural events were observed for 2 min from the time the lid valves were opened. In Experiment 2, hens and broilers were subjected to 35, 45 55 or 65% carbon dioxide with an 8 s accession period. In this experiment, a maximum of 5 min exposure to carbon dioxide was allowed at the 35% and 45% levels. The number of birds and actual gas concentrations used in this experiment are presented in Table 3. The time to loss of posture was recorded in addition to the other behavioural events recorded in Experiment 1.

TABLE 3

The mean carbon dioxide concentrations and number of hens and broilers used in Experiment 2.

| | Target carbon dioxide concentrations | | | |
|---|---|---|---|---|
| | 35% | 45% | 55% | 65% |
| Mean carbon dioxide (%) | 36 | 45 | 55 | 64 |
| Number of hens | 20 | 20 | 18 | 20 |
| Number of broilers | 20 | 20 | 20 | 18 |

The data of Experiment 1 were subjected to a un-paired t-test to determine the significance of differences between the two accession rates. The data from Experiment 2 were subjected to a two-way analysis of variance to find out the significance of differences between hens and broilers (bird type) and between different concentrations of carbon dioxide.

The results of experiment one are presented in Table 4. It was found that the times to eye closure and the onset of clonic and tonic convulsions were significantly earlier with the 8 s accession period in comparison with the 18 s period ($P<0.001$). The accession period had no effect on the duration of convulsive episodes.

The results of experiment 2 are presented in Table 5. In this experiment, 18 broilers survived the 5 min exposure at 35% carbon dioxide. For the same concentration, 18 hens survived beyond 2 min and 10 hens survived for 5 min. In 35% carbon dioxide, only 6 broilers exhibited both the clonic and tonic convulsive phases, whereas, 7 and 12 hens exhibited the clonic and tonic phases respectively. Among the survivors, 3 broilers and 3 hens exhibited clonic convulsions and 11 hens exhibited tonic convulsions. At 45% carbon dioxide, 3 broilers survived beyond 2 min, of which 2 survived for 5 min. Among the hens, 4 survived for 2 min but were dead within 4 min. All the broilers and hens died within 2 min at 55 and 65% carbon dioxide, and at 45% and above all the broilers and hens exhibited both clonic and tonic convulsions.

The results of Experiment 2 (Table 3) showed that there were significant differences between broilers and hens for all the events, except for loss of posture ($P<0.01$). The concentration of carbon dioxide had a significant effect on the time of onset of all the events ($P<0.001$). There were significant interactions between the bird type and concentration for loss of posture ($P<0.001$) and the onset of tonic phase ($P<0.05$).

The time to loss of posture decreased as the concentration of carbon dioxide increased ($P<0.001$). There was no difference in the time to loss of posture between the bird types, but the interaction between bird type and concentration was significant ($P<0.001$). In broilers the decrease in time to loss of posture in response to the increases in carbon dioxide concentration was greater than that of hens (2, 5 and 2 s vs 1, 2 and 1 s respectively in broilers and hens).

The time to eye closure showed significant differences due to bird type and concentration ($P<0.001$). Broilers had shorter time to eye closure than the hens and it decreased to a similar extent in both broilers and hens with the increases of carbon dioxide (5, 3 and 4 s vs 3, 4 and 3 s, respectively).

The time to onset of clonic convulsions varied significantly between bird type and concentrations ($P<0.001$). Broilers started to convulse earlier than the hens in all the concentrations and as the concentration of carbon dioxide increased the time to onset of clonic convulsions decreased. Broilers convulsed for a shorter duration than the hens in all the concentrations ($P<0.001$).

The onset of tonic convulsions showed significant differences due to bird type and concentration of carbon dioxide ($P<0.001$) and the interaction between them was also significant ($P<0.05$). The onset of the tonic phase decreased as the concentration increased and it occurred earlier in broilers than in hens in all the concentrations, particularly at the 35% level, leading to a significant interaction between type and concentration. This interaction was probably due to the absence of a tonic phase in the majority of the broilers, since only 6 broilers exhibited tonic phase compared to 12 hens. The duration of the tonic phase was shorter in broilers than in hens at all the concentrations ($P<0.001$).

The results indicated that a faster rate of induction achieved either by a rapid exposure to a stunning concentration or by increasing the stunning concentration reduced the time to onset of behavioural events. The decrease in time to loss of posture due to an increase in carbon dioxide concentration was particularly evident in the broilers when a concentration of 55% was used instead of 45%. Taking loss of posture as an indicator of the onset of unconsciousness, it is concluded that a rapid induction of carbon dioxide anaesthesia could be achieved in 55% carbon dioxide.

It was also evident from the present study that the rate of induction of anaesthesia depend on the time it took for the chicken to be exposed to the ultimate stunning concentration. When this interval was 8 s, while using 45% carbon dioxide (Experiment 1) the time to eye closure was 9 s quicker in comparison with an 18 s accession period with the same carbon dioxide concentration. Increasing the concentration when using an 8 s accession period (Experiment 2), further reduced the time to eye closure and the fall appeared to be linear with concentration of up to 55% carbon dioxide. The interesting finding is that the time to eye closure in 35% carbon dioxide with an 8 s accession was shorter than the time achieved in 45% carbon dioxide with an 18 s (35 s vs 38 s respectively). This tends to suggest that the shorter accession time can be more critical than that of the final concentration used for stunning. A faster rate of induction achieved by a rapid exposure to a relatively lower stunning concentration of carbon dioxide would not only help to minimise any unpleasantness associated with carbon dioxide inhalation but also help to increase the throughput in production practice.

TABLE 4

The time of occurrence
and duration (in seconds) of
behavioural events in broilers while stunning
in 45% carbon dioxide with two accession periods.

| | Time of occurrence of behavioural events Accession period: | | | | Significance of difference |
|---|---|---|---|---|---|
| | 8 seconds | | 18 seconds | | between |
| Behaviours: | mean | S.D. | mean | S.D. | means |
| Time to eye closure | 29 | 4 | 38 | 4 | *** |
| Onset of clonic convulsions | 34 | 8 | 46 | 7 | *** |
| Duration of clonic convulsions | 10 | 4 | 11 | 6 | NS |
| Onset of tonic convulsions | 53 | 8 | 65 | 4 | *** |
| Duration of tonic convulsions | 29 | 6 | 29 | 8 | NS |

NS = not significant
*** = $P < 0.001$.

TABLE 5

The time of occurrence of behavioural
patterns in different concentrations of carbon dioxide

| | Time (in seconds) of occurrence of behavioural patterns | | | | | |
|---|---|---|---|---|---|---|
| | LOP | EC | OC | DC | OT | DT |
| 35% carbon dioxide: | | | | | | |
| Broilers | 28 | 35 | 41 | 8 | 62 | 35 |
| Hens | 25 | 37 | 56 | 9 | 100 | 39 |
| 45% carbon dioxide: | | | | | | |
| Broilers | 26 | 30 | 37 | 7 | 49 | 31 |
| Hens | 24 | 34 | 42 | 9 | 62 | 38 |
| 55% carbon dioxide: | | | | | | |
| Boilers | 21 | 27 | 29 | 5 | 43 | 33 |
| Hens | 22 | 30 | 34 | 8 | 48 | 44 |
| 65% carbon dioxide: | | | | | | |
| Broilers | 19 | 23 | 26 | 5 | 37 | 29 |
| Hens | 21 | 28 | 31 | 8 | 45 | 38 |
| Overall: | | | | | | |
| Bird type: | | | | | | |
| Broilers | 24 | 29 | 32 | 6 | 45 | 32 |
| Hens | 23 | 32 | 38 | 9 | 60 | 40 |
| Concentrations: | | | | | | |
| 35% | 26 | 36 | 49 | 9 | 87 | 37 |
| 45% | 25 | 32 | 39 | 8 | 56 | 35 |
| 55% | 22 | 28 | 32 | 7 | 45 | 38 |
| 65% | 20 | 26 | 29 | 7 | 41 | 34 |
| SEM | 0.29 | 0.31 | 0.69 | 0.34 | 1.66 | 0.69 |
| (df) | 147 | 148 | 119 | 119 | 124 | 124 |
| Significance of differences between means: | | | | | | |
| Bird type (B) | NS | * | * |  | * | *** |
| Concentration (C) | * | * | * | NS | * | NS |
| Interaction (B × C) | *** | NS | NS | NS | * | NS |

EC = eye closure;
LOP = loss of posture;
OC = onset of clonic phase;
DC = duration of clonic phase;
OT = onset of tonic phase;
DT = duration of tonic phase.
NS = not significant;
* = $P < 0.05$;
** = $P < 0.01$;
*** = $P < 0.001$.
[a]6 broilers exhibited convulsive phases.
[b]7 and 12 hens exhibited clonic and tonic phases, respectively.

EXAMPLE 4

Experimental procedures

This experiment was divided into four treatments according to the concentration of the stunning gas. The nominal concentration of the gases were 45 and 55% carbon dioxide, and 2 and 5% oxygen which was achieved by displacing air with argon. In each of the four treatments the birds were exposed to the stunning gas for 2 min. Eight week old broilers were stunned in batches of ten per transport crate (80 cm×50 cm×28 cm) by exposing them to the stunning atmosphere within 18 s. This was achieved by placing the crate on a lift which was then lowered into a well containing one of the stunning gases, and the gas concentrations were measured continuously as described for example 1. Ten batches of broilers were used in each of three treatments 45% carbon dioxide 55% air, 55% carbon dioxide 45% air and an argon-air mixture including 2% oxygen treatments, and 2 batches were exposed to an argon-air mixture including 5% by volume of oxygen. This last treatment had to be discontinued as it was found that the broilers were fully conscious after a 2 min exposure period.

Immediately after stunning all the birds were uncrated, shackled and observed for 6 min post-stunning for signs of recovery of consciousness or failure to die. During this period the birds were examined continuously and in the live birds the response to comb pinch tested. The time to opening the eyes and the time to response to a comb pinch were recorded.

Results

The results of this study are presented in Table 6, which shows that 28 and 8 broilers, respectively, survived at 45% carbon dioxide and 2% oxygen. At 55% carbon dioxide all the birds died and at 5% oxygen all the birds were fully conscious after the 2 min exposure period.

In general, the survivors exhibited two different kinds of response during the recovery period. In the first category, the broilers regained consciousness slowly and responded to comb pinch before opening their eyes, whereas in the second category, the birds opened their eyes but took a longer time to show a positive response to comb pinch, or, failed to show a positive response to comb pinch until the end of the 6 min post-stunning observation period.

Among the 28 survivors in the 45% carbon dioxide treatment 24 and 4 broilers, respectively, belonged to category one and two. In the case of the 2% oxygen treatment which had 8 survivors, these numbers were 2 and 6, respectively, in category one and two. The time to recovery does not include the 18 s during which the birds were brought to the atmospheric air from the bottom of the gas well. In the 45% carbon dioxide treatment the survivors of category one took 90 s (range=26–290 s) before showing a positive response to comb pinch, whereas the survivors of category two had a mean time of 258 s (range=200–360 s) to open the eyes and they did not respond to comb pinch until the end of the 6 min. period. In the 2% oxygen treatment these timings were 34 s (15 & 52) and 12 s (range=0–20 s) respectively in category one and two, however, the category two birds in this treatment showed a positive response to comb pinch in 213 s (range 60–420 s).

The results indicated that stunning broilers with 45% carbon dioxide resulted in 28 survivors showing two different patterns of recovery from anaesthesia. In category one, which included the majority of the survivors, the birds responded to comb pinch as early as 26 s post-stunning. This concentration would be unsuitable, therefore, on both welfare and practical grounds, as the time interval between stunning and regaining consciousness was small and would not be sufficient to allow uncrating, shackling and neck cutting to be performed whilst all the birds were unconscious. The second category, in which birds opened their eyes between 200 and 360 s but failed to show a positive response to comb pinch, may not be a practical problem, and it tends to confirm that in some birds the analgesic effect of carbon dioxide can be prolonged, beyond the resumption of consciousness. However, using 55% carbon dioxide did not give rise to these problems as it killed all the birds and moreover the induction of anaesthesia was rapid. Based on these results killing broilers in 55% carbon dioxide would be ideally suited for commercial application.

The oxygen concentration used for stunning chickens by hypoxia appears to be even more critical. Five percent oxygen was not sufficient to stun the broilers within a 2 min exposure period. In commercial situations a long exposure time would be required when using 5% oxygen and this may not always be feasible. At 2% oxygen 8 broilers survived and they showed rapid recovery soon after the 2 min exposure period. In this treatment, one of the birds (in category two) showed wing flapping during shackling and another (category one) showed a positive response to comb pinch at 15 s post-stunning. Accordingly, 2% oxygen can be used to kill broilers provided the concentration does not exceed this level at the centre of the transport crate. To produce this effect a concentration of less than 1% may be needed alongside the crate when it is immersed in the stunning gas. Alternatively a longer exposure time than two minutes may be used.

TABLE 6

Stunning procedures, number of survivors and the time to recovery.

| | Stunning treatment groups (2 min exposure) | | | |
|---|---|---|---|---|
| | Carbon dioxide | | argon | |
| Particulars | 45% | 55% | 2% oxygen | 5% oxygen |
| Total no of birds | 100 | 100 | 100 | 20 |
| No of birds per crate | 10 | 10 | 10 | 10 |
| Actual gas concentration (mean ± S.D.) | 45 ± 1 | 56 ± 1 | 2 ± 0.2 | 5 ± 0.1 |
| Number of birds: | | | | |
| total survivors | 28 | Nil | 8 | 20 |
| which responded to comb pinch before their eyes opened their time(s) to +ve comb pinch | 24 | Nil | 2 | — |
| range | 26–290 | — | 15 & 52 | — |

TABLE 6-continued

Stunning procedures, number of survivors and the time to recovery.

| | Stunning treatment groups (2 min exposure) | | | |
|---|---|---|---|---|
| | Carbon dioxide | | argon | |
| Particulars | 45% | 55% | 2% oxygen | 5% oxygen |
| mean | 90 | — | 34 | — |
| which opened eyes but no response to comb pinch their time to eyes open | 4 | Nil | 6 | — |
| range | 200–360 | — | 0–20 | — |
| mean | 258 | — | 12 | — |
| their time to +ve comb pinch | | | | |
| range | NR | — | 60–420 | — |
| mean | — | — | 213 | — |

NR = no response to comb pinch until end of observation time (6 min maximum).

EXAMPLE 5

The merits of gaseous stunning procedures were evaluated further by examining the incidence of broken bones in the carcasses broilers slaughtered by using 2% oxygen or 45% or 55% carbon dioxide or electrical stunning in comparison with the Euthatal control (no stunning treatment). The gaseously stunned broilers were stunned in batches of ten per transport crate as described under example 3. Electrical stunning was performed by using a water bath stunner delivering 107 mA for 4S. After slaughtering, the unplucked and uneviscerated carcasses were crated and frozen until dissected for the examination of broken bones.

The results indicated that the gaseous stunning methods resulted in a lower incidence of broken bones when compared to electrical stunning.

The results are presented in Table 7 which shows that the percentage of birds with broken bones in the gaseous stunning treatments were very much lower when compared to electrical stunning for the current used in this study. Although the control group injected with Euthatal had a similar incidence of broken bones as that of 2% oxygen treatment, the majority of Euthatal treated birds had broken pubis, which could have occurred due to crating and uncrating of the birds.

When the individual bones were grouped according to their anatomical location, it is apparent that the incidence of broken pectoral bones (scapula, coracoid and furculum) was lower in the gaseous stunned birds (2, 5 and 1 respectively in 2% oxygen, 45% and 55% carbon dioxide). In contrast, this incidence was 47 in the electrically stunned birds. The incidence of broken wing bones (humerus, radius and ulna) occurred to a similar extent in electrical stunning and in the 2% oxygen treatment (8 and 10 respectively), but was slightly higher in the carbon dioxide treatment (13 and 16 respectively in 45% and 55% levels).

The incidence of broken leg bones (femur, tibiotarsus and fibula), keel, lateral process and pelvic bones (pelvis, illium, ischium and pubis) were low in the stunning treatments. The higher incidence of broken dorsal ribs in the 55% carbon dioxide treatment is thought to be an artefact due to the handling of stacked crates during storage, rather than the stunning procedure.

It is concluded that stunning of broilers in 2% oxygen or 45% carbon dioxide or 55% carbon dioxide resulted in lower incidence of broken bones (0.014, 0.26 and 0.27 per bird) when compared to electrical stunning (0.63 per bird).

TABLE 7

Incidence of Broken Bones in Different Stunning Procedures

| | Slaughter methods | | | | |
|---|---|---|---|---|---|
| | 2% $O_2$ (Argon-air) | 45% $CO_2$ 55% air | 55% $CO_2$ 45% air | Electrical | Euthatal |
| Number of birds killed | 92 | 72 | 100 | 100 | 50 |
| Percentage of birds with one or more broken bones | 11 | 17 | 23 | 39 | 14 |
| Broken bones per bird | 0.14 | 0.26 | 0.27 | 0.63 | 0.14 |
| Number of individual broken bones: | | | | | |
| Femur | 0 | 0 | 0 | 1 | 0 |
| Tibiotarsus | 0 | 1 | 0 | 1 | 0 |
| Fibula | 0 | 0 | 0 | 1 | 0 |
| Humerus | 4 | 2 | 6 | 3 | 1 |
| Radius | 4 | 6 | 6 | 2 | 0 |
| Ulna | 2 | 5 | 4 | 3 | 0 |
| Keel | 0 | 0 | 0 | 0 | 0 |
| Lateral process | 0 | 0 | 0 | 0 | 0 |
| Scapula | 0 | 2 | 0 | 32 | 1 |
| Coracoid | 0 | 0 | 1 | 3 | 0 |
| Furculum | 2 | 3 | 0 | 12 | 0 |
| Dorsal | 0 | 0 | 10 | 0 | 1 |
| Ventral ribs | 0 | 0 | 0 | 0 | 0 |
| Pelvis | 0 | 0 | 0 | 2 | 0 |
| Illium | 0 | 0 | 0 | 0 | 0 |
| Ischium | 0 | 0 | 0 | 1 | 0 |
| Pubis | 1 | 0 | 0 | 2 | 4 |

We claim:

1. A method of slaughtering poultry, comprising transporting the poultry, including groups of birds, packed in a crate to a place of slaughter and slaughtering said poultry at said place of slaughter without removing said poultry from said crate by passing the crate packed with said poultry into a chamber having an oxygen-depleted atmosphere and holding the poultry in the atmosphere for a sufficient period of time for the poultry first to lose consciousness and then to die as a result of anoxia, the oxygen-depleted atmosphere formed by mixing argon with air so that said oxygen-depleted atmosphere contains less than 2% oxygen, the poultry undergo convulsions after the lose consciousness, and the necks of the poultry are cut upon their removal from the chamber.

2. A method as claimed in claim 1, in which the atmosphere contains less than 1% by volume of oxygen.

3. A method as claimed in claim 2, in which the total time of exposure of the poultry is at least 2 minutes.

* * * * *